(12) United States Patent
Rumpf et al.

(10) Patent No.: US 12,387,288 B2
(45) Date of Patent: Aug. 12, 2025

(54) CONFORMAL FREQUENCY SELECTIVE SURFACES FOR ARBITRARY CURVATURE

(71) Applicant: Board of Regents, The University of Texas System, Austin, TX (US)

(72) Inventors: Raymond C. Rumpf, El Paso, TX (US); Cesar Luis Valle, El Paso, TX (US); Gilbert T. Carranza, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 539 days.

(21) Appl. No.: 17/934,717

(22) Filed: Sep. 23, 2022

(65) Prior Publication Data

US 2023/0103064 A1    Mar. 30, 2023

Related U.S. Application Data

(60) Provisional application No. 63/261,640, filed on Sep. 24, 2021.

(51) Int. Cl.
*G06T 3/00* (2024.01)
*G06F 17/16* (2006.01)
*H01Q 21/24* (2006.01)

(52) U.S. Cl.
CPC ............ *G06T 3/00* (2013.01); *G06F 17/16* (2013.01); *H01Q 21/24* (2013.01)

(58) Field of Classification Search
CPC .................. G06T 3/00; G06F 17/16
See application file for complete search history.

(56) References Cited

U.S. PATENT DOCUMENTS

2005/0285919 A1* 12/2005 Martinez, Jr. .......... B41J 3/4073
347/101

OTHER PUBLICATIONS

Rumpf et al, Spatially variant periodic structures in electromagnetics, Feb. 12, 2015, The Royal Society Publishing (Year: 2015).*

* cited by examiner

*Primary Examiner* — Mark A Connolly
(74) *Attorney, Agent, or Firm* — Yee & Associates, P.C.

(57) ABSTRACT

A method of conforming a periodic array to a surface is provided. The method comprises calculating, with a spatially-variant lattice algorithm, a pair of planar gratings across the surface, wherein the planar gratings are generated via reciprocal lattice vectors and summing the pair of planar gratings. Intersections produced by summing the gratings are scanned for maxima on the surface, and a periodic array of elements is located at the maxima on the surface. A normal vector is calculated at each maximum on the surface, and each element is rotated to match the direction of the respective normal vector at each maximum on the surface. The elements are then conformed to the surface via a shrink-wrap modifier operation.

20 Claims, 18 Drawing Sheets

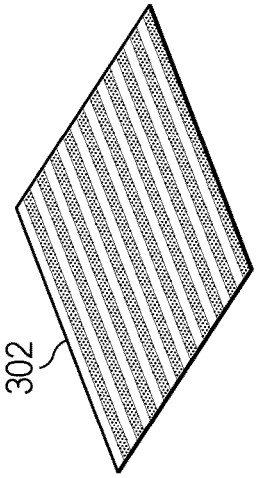 + 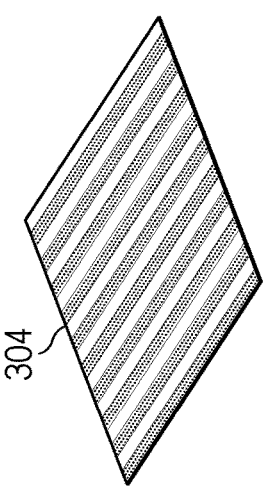 = 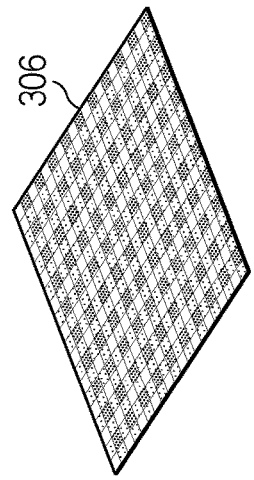
FIG. 3A
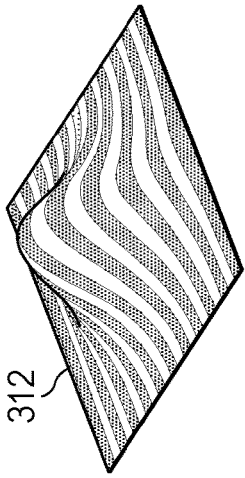 + 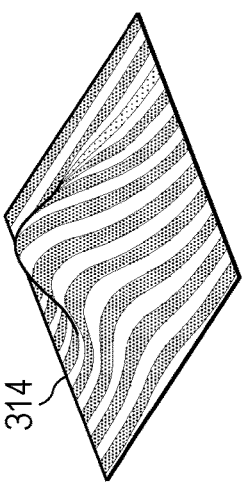 = 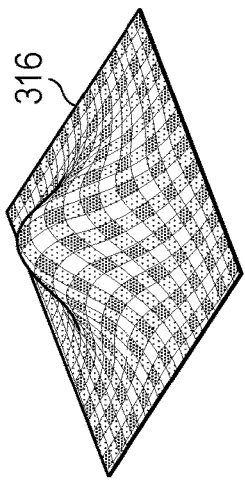
FIG. 3B
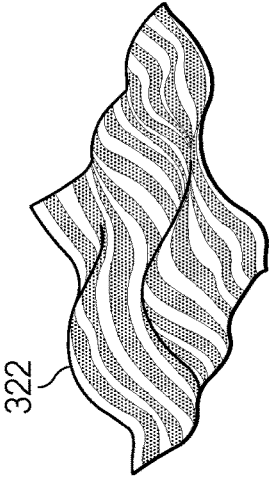 + 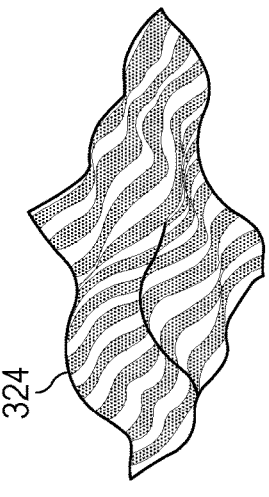 = 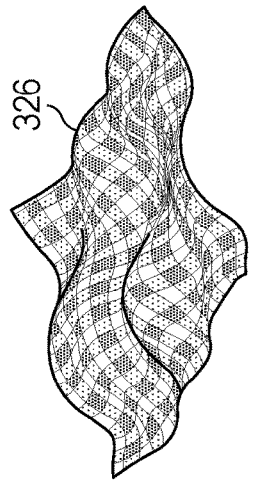
FIG. 3C

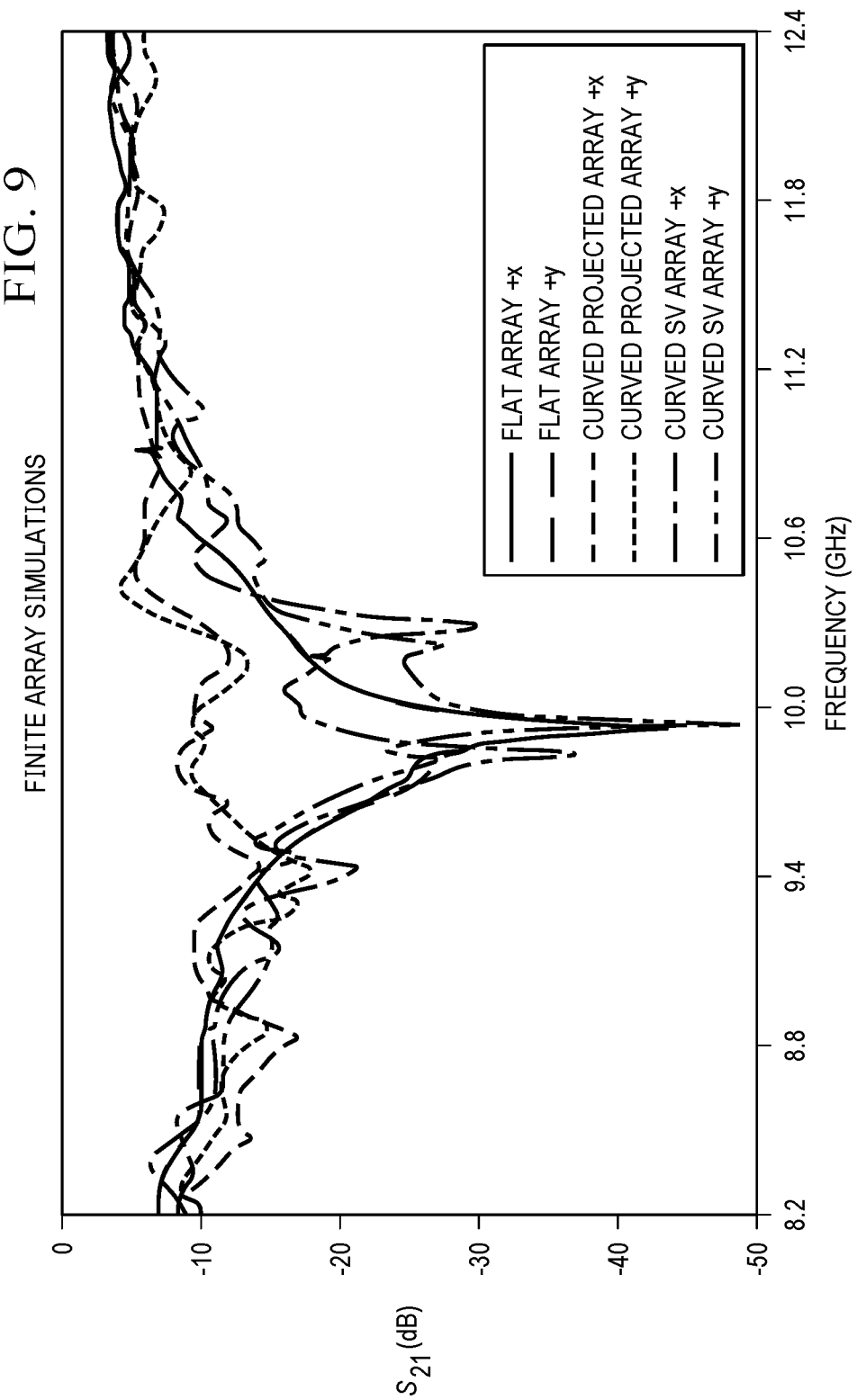

CONFORMAL FREQUENCY SELECTIVE SURFACES FOR ARBITRARY CURVATURE

BACKGROUND INFORMATION

1. Field

The present disclosure relates generally to frequency selective surfaces, and more specifically, to an algorithm to conform a frequency selective surface while maintaining electromagnetic properties.

2. Background

A frequency selective surface (FSS) is a periodic array of elements designed to either stop or pass certain electromagnetic frequencies in a given range. The properties of a FSS can be tailored via element design. Common element designs range from loop elements, to square, circular or hexagonal plates, fractal designs, and even "3D" element designs. Slotted arrays are another popular form of design and feature band pass behavior. Not limited to metallic elements, FSS designs can be all-dielectric based on guided-mode resonance (GMR) which prove particularly useful for high-power applications. Other popular forms of design are current sheet arrays or active arrays. The wide variety of element designs and form of operation (active, passive, reflective, etc.) give the user a seemingly limitless choice when it comes to array design.

Practical use of FSS designs require a flat design to be fitted on some curvature. Examples of such applications include radar cross section (RCS) reduction on antenna radomes, RCS reduction designs on planes for stealth applications, and electromagnetic shielding among others. With recent advances in additive manufacturing, there has been interest in placing FSS designs onto bendable or flexible 3D printed substrates. 3D printing systems that make use of more than three axes are also a good fit for manufacturing conformal electronics and FSS.

SUMMARY

An illustrative embodiment provides a computer-implemented method of conforming a periodic array to a surface. The method comprises calculating, with a spatially-variant lattice algorithm, a pair of planar gratings across the surface, wherein the planar gratings are generated via reciprocal lattice vectors and summing the pair of planar gratings. Intersections produced by summing the gratings are scanned for maxima on the surface, and a periodic array of elements is located at the maxima on the surface. A normal vector is calculated at each maximum on the surface, and each element is rotated to match the direction of the respective normal vector at each maximum on the surface. The elements are then conformed to the surface via a shrink-wrap modifier operation.

Another illustrative embodiment provides a system for conforming a periodic array to a surface. The system comprises a storage device configured to store program instructions and one or more processors operably connected to the storage device and configured to execute the program instructions to cause the system to: calculate, with a spatially-variant lattice algorithm, a pair of planar gratings across the surface, wherein the planar gratings are generated via reciprocal lattice vectors; sum the pair of planar gratings; scan intersections produced by summing the gratings for maxima on the surface; locate a periodic array of elements at the maxima on the surface; calculate a normal vector at each maximum on the surface; rotate each element to match the direction of the respective normal vector at each maximum on the surface; and conform the elements to the surface via a shrink-wrap modifier operation.

Another illustrative embodiment provides a computer program product for conforming a periodic array to a surface. The computer program product comprises a computer-readable storage medium having program instructions embodied thereon to perform the steps of: calculating, with a spatially-variant lattice algorithm, a pair of planar gratings across the surface, wherein the planar gratings are generated via reciprocal lattice vectors; summing the pair of planar gratings; scanning intersections produced by summing the gratings for maxima on the surface; locating a periodic array of elements at the maxima on the surface; calculating a normal vector at each maximum on the surface; rotating each element to match the direction of the respective normal vector at each maximum on the surface; and conforming the elements to the surface via a shrink-wrap modifier operation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 3A-3C depict diagrams illustrating planar gratings for square symmetry generated over different surfaces in accordance with an illustrative embodiment;

FIG. 9 depicts a graph illustrating the results of finite FSS array simulations in accordance with an illustrative embodiment;

DETAILED DESCRIPTION

The illustrative embodiments recognize and take into account one or more different considerations as described herein. For example, the illustrative embodiments recognize and take into account that with recent advances in additive manufacturing, there has been interest in placing FSS designs onto bendable or flexible 3D printed substrates. The illustrative embodiments recognize and take into account that 3D printing systems are a good fit for manufacturing conformal electronics and FSS.

The illustrative embodiments also recognize and take into account that despite a plethora of element designs and applications, very little work has been done regarding the effects of placing periodic structures on arbitrary curved surfaces. Often, FSS arrays are designed without thought to the curvature they will be placed on.

The illustrative embodiments also recognize and take into account that a common practice is to design a flat array and then project the pattern onto whatever curvature an application requires. This approach deforms the elements that lie on slopes and can often destroy periodicity making the array non-functional. In other examples, FSS are conformed to canonical shapes or surfaces with a large bend radius. Examples of compensating for curvature include a 1D GMR filter where the period was chirped to compensate for the curved surface it was placed on as well as the curvature of the spherical wave front illuminating the device. Similar extensions of this method can be found for 2D conformal array analysis that take a more careful consideration how elements are placed and rotated along a curve.

In previous work, an algorithm was developed that can spatially vary or functionally grade different aspects of a periodic lattice while keeping the lattice smooth, continuous, and defect free. This spatially-variant lattice (SVL) algorithm was used to generate abrupt photonic crystal bends, generate spatially-variant anisotropic metamaterials, form novel lenses into photonic crystals, and metamaterial devices designed by transformation optics. Not limited to photonic crystals, the SVL algorithm can be applied to any periodic structure including reflectarrays, phased array antennas, metasurfaces, and more.

The illustrative embodiments provide a conformal SVL algorithm capable of optimizing the layout of an FSS for operation on virtually any curved surface while maintaining the overall size, shape, and spacing of the FSS elements. In comparison to popular projection techniques, the SVL algorithm preserves the periodicity of the array no matter how abrupt or highly sloping the curvature is. The SVL algorithm is also agnostic to both the curvature and element type.

Figure 1:
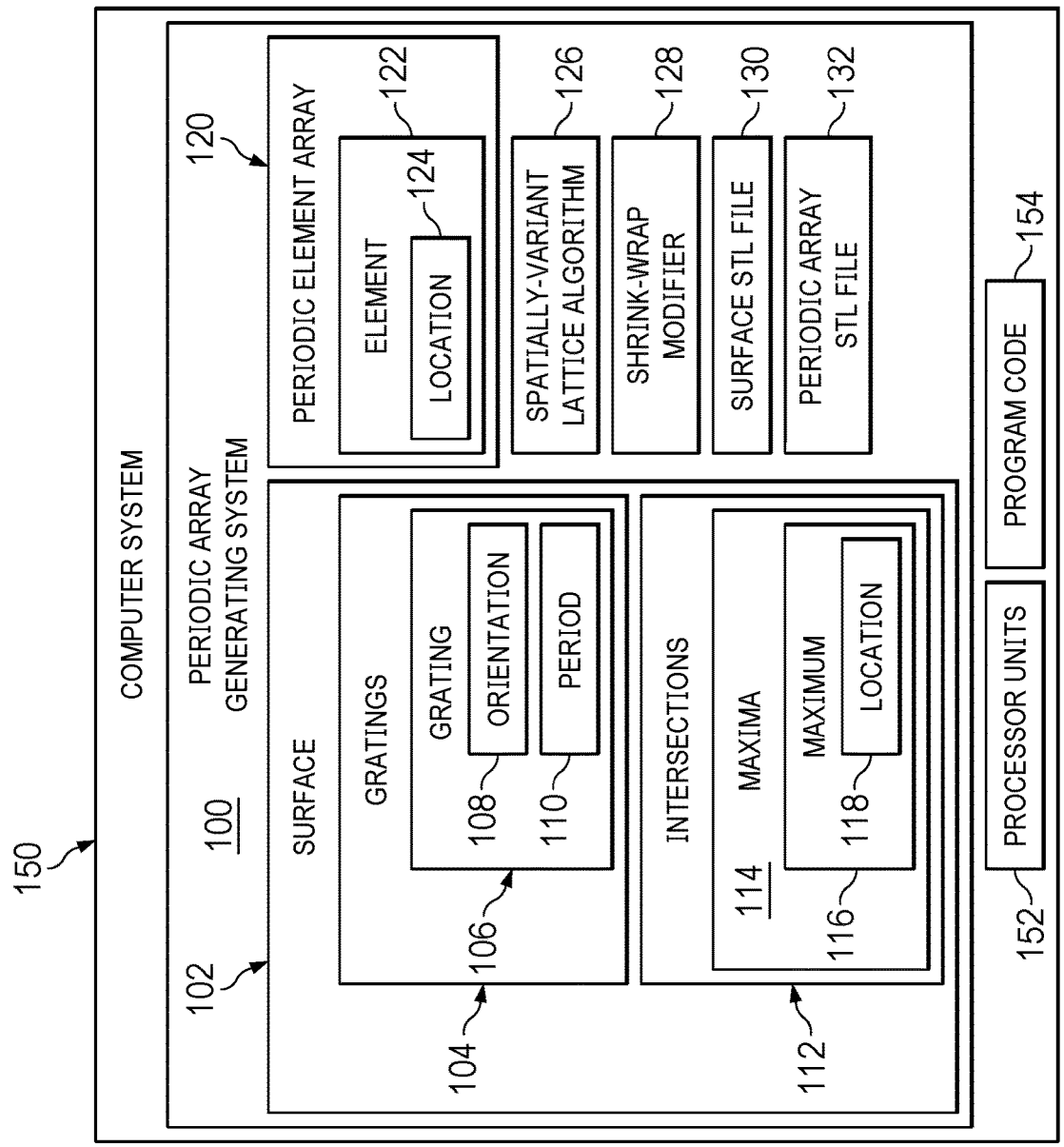
FIG. 1 depicts a block diagram of a periodic array generating system in accordance with an illustrative embodiment.

FIG. 1 depicts a block diagram of a periodic array generating system in accordance with an illustrative embodiment. Periodic array generating system 100 generates a pair of gratings 104 on a surface 102 which may be curved. Gratings 104 may be calculated by spatially-variant lattice (SVL) algorithm 126. Each grating 106 has an orientation 108 and period 110.

When the gratings 104 are summed, the resulting intersections 112 comprise maxima 114 on the surface 102. Each maximum 116 has a respective location 118.

Periodic element array 120 is projected on surface 102 and may comprise, for example, a frequency selective surfaces (FSS) array. Each element 122 in element array 120 has a corresponding location 124 that corresponds with a location 118 of a maximum on surface 102. Each element 122 is conformed to surface 102 by an operation of shrink-wrap modifier 128.

Periodic array generating system 100 generates a surface standard tessellation language (STL) file 130 for surface 102. Periodic array generating system 100 also generates a separate periodic array STL file 132 for FSS element array 120.

Periodic array generating system 100 can be implemented in software, hardware, firmware, or a combination thereof. When software is used, the operations performed by Periodic array generating system 100 can be implemented in program code configured to run on hardware, such as a processor unit. When firmware is used, the operations performed by periodic array generating system 100 can be implemented in program code and data and stored in persistent memory to run on a processor unit. When hardware is employed, the hardware can include circuits that operate to perform the operations in periodic array generating system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

The illustrative embodiments begin arranging periodic elements with the generation of SV gratings. In a form that is analogous to a wave vector, a grating vector $\vec{K}(\vec{r})$ is defined as a function of position $\vec{r}$ across the array as $$\vec{K}(\vec{r}) = \frac{2\pi}{\Lambda(\vec{r})} \{\hat{x}\cos[\theta(\vec{r})] + \hat{y}\sin[\theta(\vec{r})]\} \tag{1}$$

where $\Lambda(\vec{r})$ is the period of the grating and $\theta(\vec{r})$ is the orientation of the grating, both as functions of position with the position vector as $\vec{r} = x\hat{x} - y\hat{y}$. To properly calculate the grating when the grating vector is a function of position, an intermediate parameter called the grating phase $\Phi(\vec{r})$ is introduced, which is related to the grating vector through $$\nabla\Phi(\vec{r}) = \vec{K}(\vec{r}). \tag{2}$$

Equation (2) is overdetermined and therefore solved as a best fit, for example using least squares. From its solution, a spatially variant grating $\varepsilon(\vec{r})$ is calculated according to $$\varepsilon(r) = \cos[\Phi(\vec{r})] \tag{3}$$

Up to this point, spatially-variant gratings are generated across a flat plane with no information about the curvature or object onto which the grating will be placed. To account for curvature, the grating period is modified as a function of position.

Figure 2:
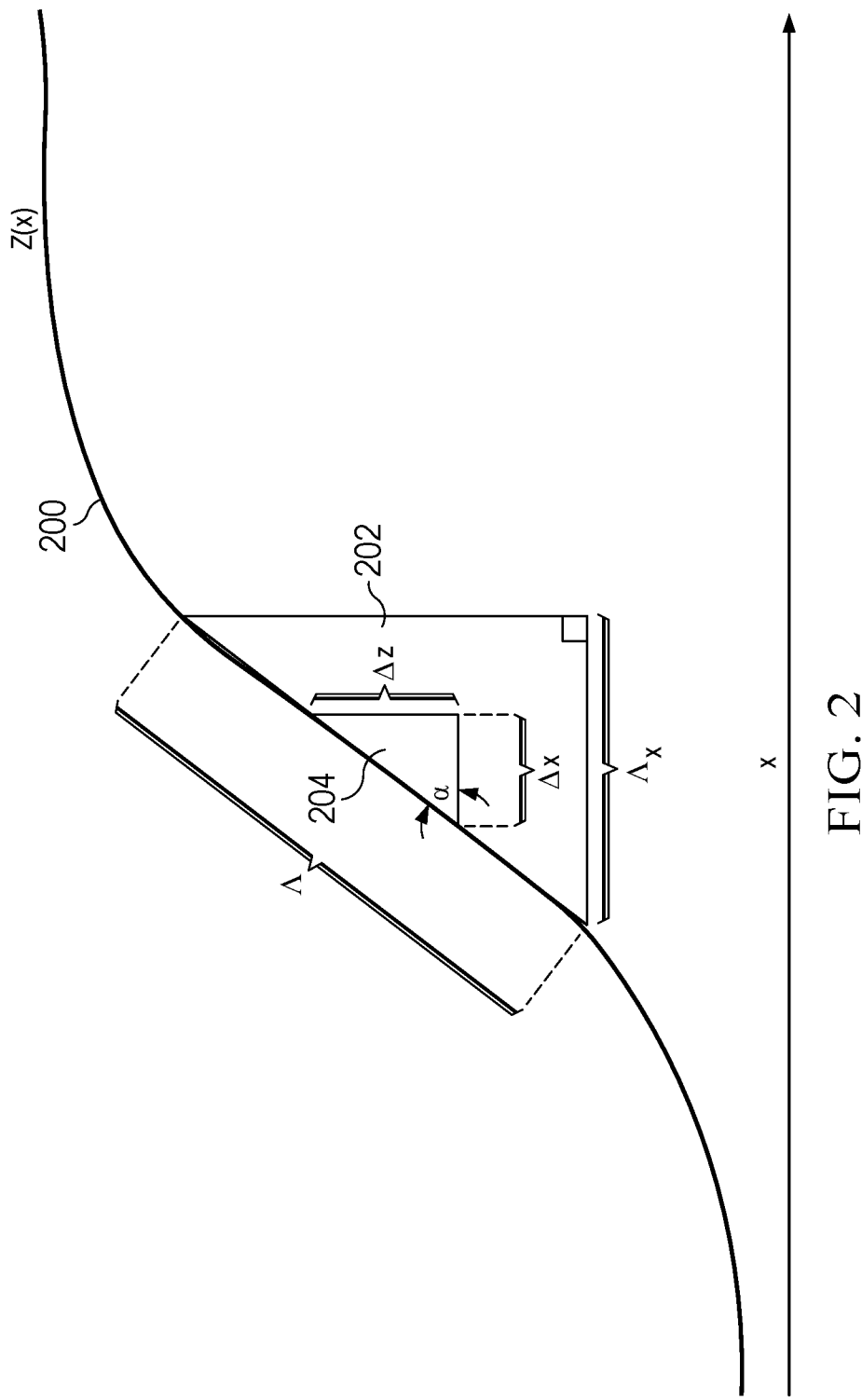
FIG. 2 depicts a diagram of the cross section of a curve used to adjust the period of a single SVL grating in a way that accounts for curvature in accordance with an illustrative embodiment.

FIG. 2 depicts a diagram of the cross section of a curve used to adjust the period of a single SVL grating in a way that accounts for curvature. The curve Z(x) 200 is the surface onto which a periodic structure will be placed. Two similar triangles 202, 204 are defined, both containing the angle α. The larger triangle 202 contains the hypotenuse of length Λ representing the period along the curved surface 200 without any modifications and stretched out by the curvature. The period $\Lambda_x$ represents the adjusted period that will be used as an input to the SVL algorithm. The smaller triangle 204 contains sides Δx and Δz. Using the smaller triangle 204, by solving for α and taking the limit as Δx and Δz approach zero, the result arrives at $$\alpha = \tan^{-1}\left(\frac{dz}{dx}\right). \tag{4}$$

Due to the nature of similar triangles 202, 204, the angle α also has the relation $$\cos(\alpha) = \frac{\Lambda_x}{\Lambda} \tag{5}$$

based on the larger triangle 202. By substituting α from equation (4) into equation (5), $\Lambda_x$ can be derived as $$\Lambda_x = \Lambda\cos\left[\tan^{-1}\left(\frac{dz}{dx}\right)\right]. \tag{6}$$

This result is the adjusted input period for a 1D case, which can be generalized for a 2D surface along the x and y directions by taking the gradient of the surface, leading to a new adjusted period that is also a function of position $$\Lambda'(\vec{r}) = \Lambda(\vec{r})\cos\{\tan^{-1}[\nabla Z(\vec{r})]\} \tag{7}$$

where $\Lambda'(\vec{r})$ is the adjusted period in 2D and $Z(\vec{r})$ describes the surface the array will be placed onto. Finally, Equation (1) is modified by substituting equation (7) in place of the original grating period.

$$\vec{K}(\vec{r}) = \frac{2\pi}{\Lambda'(\vec{r})} \{\hat{x}\cos[\theta(\vec{r})] + \hat{y}\sin[\theta(\vec{r})]\} \tag{8}$$

To build an array, two separate planar gratings need to be calculated. These gratings are generated using reciprocal lattice vectors. Different sets of vectors can be used for hexagonal symmetry, oblique symmetry, etc. For square symmetry the reciprocal lattice vectors are $$\vec{T}_1 = \frac{2\pi}{\Lambda}\hat{x} \tag{9}$$

$$\vec{T}_2 = \frac{2\pi}{\Lambda}\hat{y} \tag{10}$$

where the coefficient 2π/Λ in both expressions is the magnitude of the grating vector and contains the period Λ of the device.

FIGS. 3A-3C depict diagrams illustrating planar gratings for square symmetry generated over different surfaces in accordance with an illustrative embodiment. The first two columns show a plot of a single planar grating generated using reciprocal lattice vectors $\vec{T}_1$ and $\vec{T}_2$, respectively. FIG. 3A shows gratings 302, 304 generated on a plane with no curvature. This type of grating is the standard output of the SVL algorithm where 1D planar gratings are generated without accounting for any curvature. FIG. 3B shows planar gratings 312, 314 whose period has been adjusted to account for the curvature of a two-dimensional Gaussian function. Lastly, the bottom row shows the same gratings 322, 324 generated over a randomly generated surface.

FIG. 3C shows the sums 306, 316, 326 of the planar gratings in each row. The intersections of the two gratings are used to identify the locations of the FSS elements.

Due to the algorithm being solved in the sense of least squares (i.e., best fit), slight deformations in the period and orientation may exist. These deformations can be improved via deformation control. For the application of a FSS, the period of the device may be reinforced at the expense of orientation. This tradeoff is acceptable when elements are chosen that are polarization independent due to having rotational symmetry.

Figure 4A:
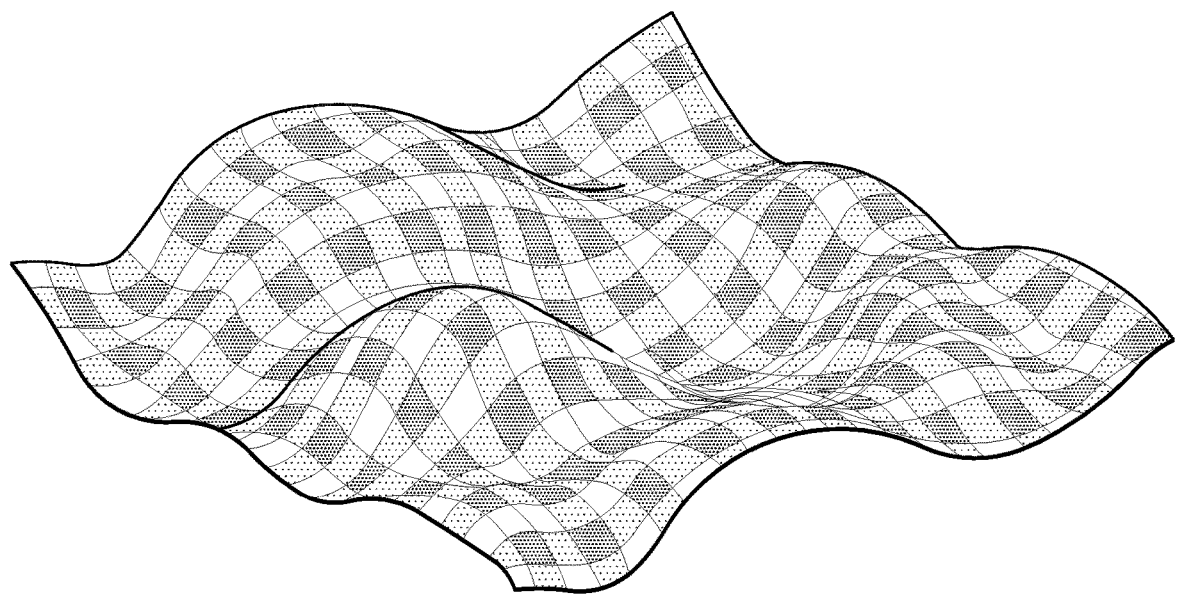
FIG. 4A depicts a random curvature resulting from the sum of two planar gratings in accordance with an illustrative embodiment.

FIGS. 4A-4D depict a sequence of building a FSS array in accordance with an illustrative embodiment. FIG. 4A depicts a random curvature resulting from the sum of two planar gratings. To build a FSS array, the intersection of the two planar gratings is scanned for the maxima. The locations of these maxima are stored in a separate array.

Figure 4B:
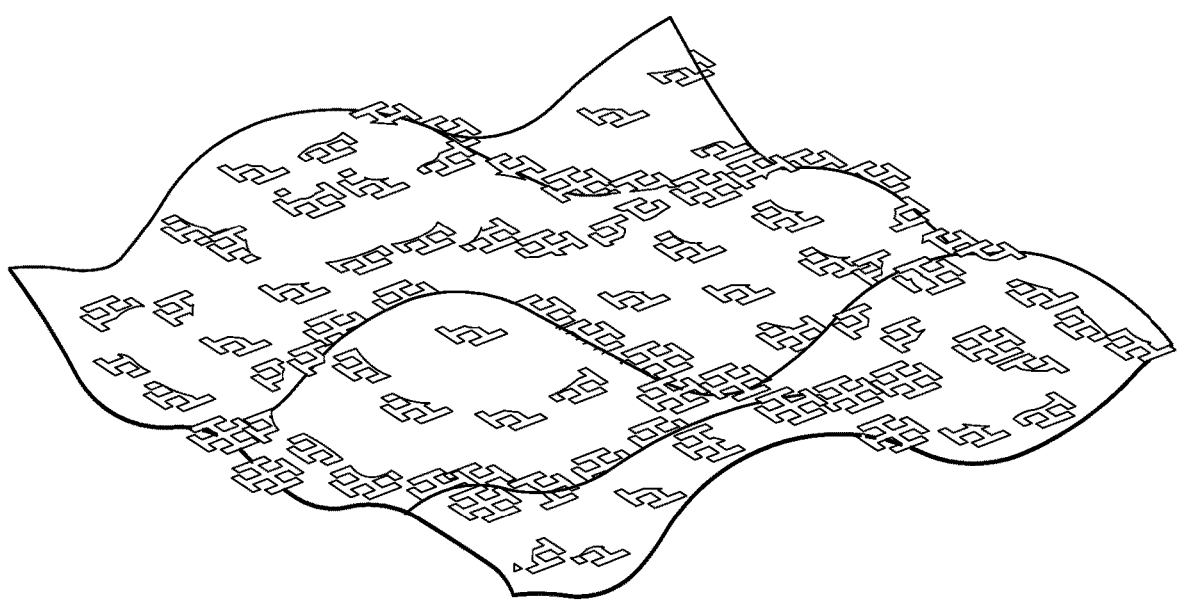
FIG. 4B depicts FSS elements placed flat on the locations of the maxima in accordance with an illustrative embodiment.

FIG. 4B depicts FSS elements placed flat on the locations of the maxima. The FSS element may be modeled in CAD and exported as a standard tessellation language (STL) file format. The element STL was imported into MATLAB and placed at each of the maxima identified previously. For the FSS array to be built properly, elements cannot be placed flat at the locations of the maxima. Instead, the elements were oriented to be at an angle tangential to the curvature, shown in FIG. 4C. This orientation may be accomplished by calculating the vector normal to the curvature at the locations of the maxima and rotating the FSS elements to match the direction of the normal vector. All the positioned and oriented FSS elements are combined and exported as a single STL file. Alternatively, each FSS element may be shrink-wrapped individually.

Figure 4C:
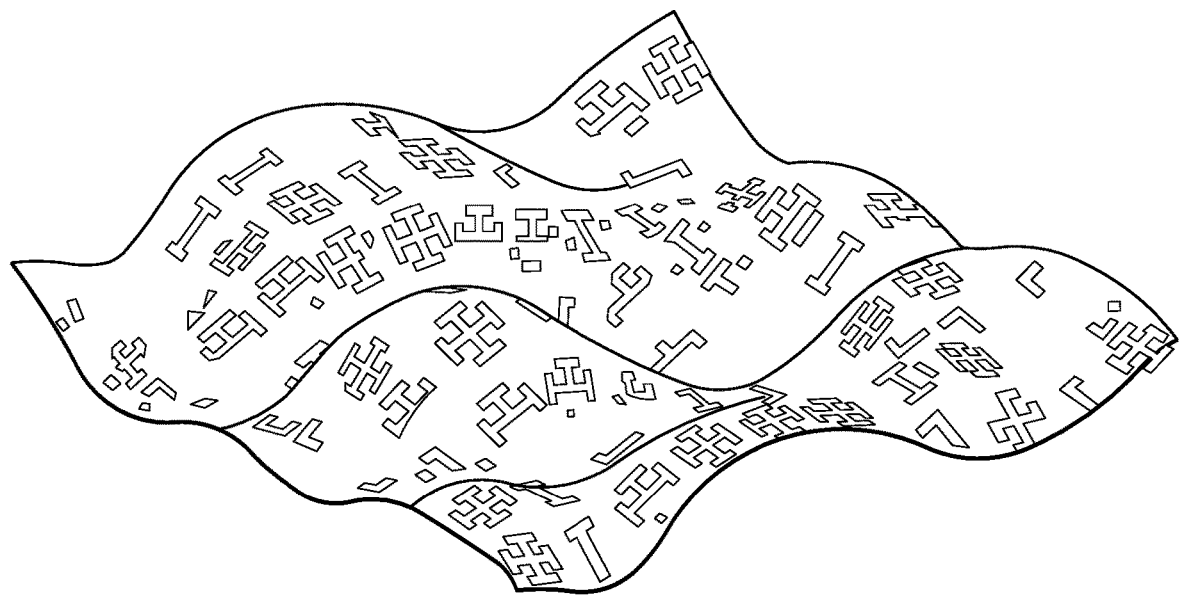
FIG. 4C depicts FSS elements oriented tangentially to the curvature in accordance with an illustrative embodiment.

The oriented elements shown in FIG. 4C still show some of the elements intersecting with the curvature where the curvature is most severe. To fix this, the curvature and the array of elements may be imported into the open-source modeling software, e.g., Blender or similar algorithm.

Figure 4D:
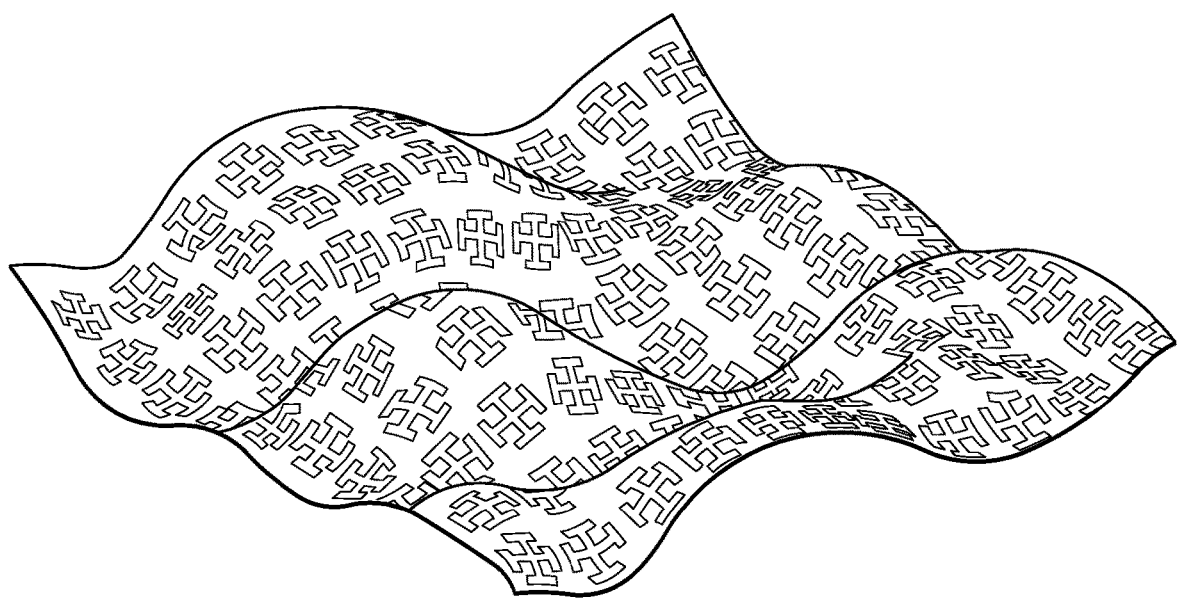
FIG. 4D depicts the FSS elements shrink-wrapped flush to the curvature in accordance with an illustrative embodiment.

FIG. 4D depicts the FSS elements shrink-wrapped flush to the curvature. Each FSS element is conformed perfectly to the curvature using a shrink-wrap modifier operation. The shrink-wrap modifier moves each vertex of an object being modified to a closest position on the surface, thereby allowing the object to conform perfectly to the surface of another object. The shrink-wrap operation is not used to position or orient the FSS elements across the curvature; it is a post-processing step to eliminate voids and overlaps between the FSS elements and the curved surface. The final FSS array and curved surface may be exported as separate STLs from Blender.

To demonstrate the algorithm's capability of conforming a FSS to a curve while preserving its electromagnetic performance, an array of Jerusalem Cross (JC) elements was generated using the algorithm described above. This element was chosen for several reasons: its popularity and extensive use in literature, less sensitivity to polarization and angle of incidence, relatively complicated geometry to exercise the algorithm, and its sensitivity to size and shape make it suitable for demonstrating the conformal SV algorithm. The curve follows a tall parabolic dome of non-equal x and y axes. This curvature was chosen as an extreme case capable of demonstrating the power and robustness of the conformal SV algorithm.

Figure 5:
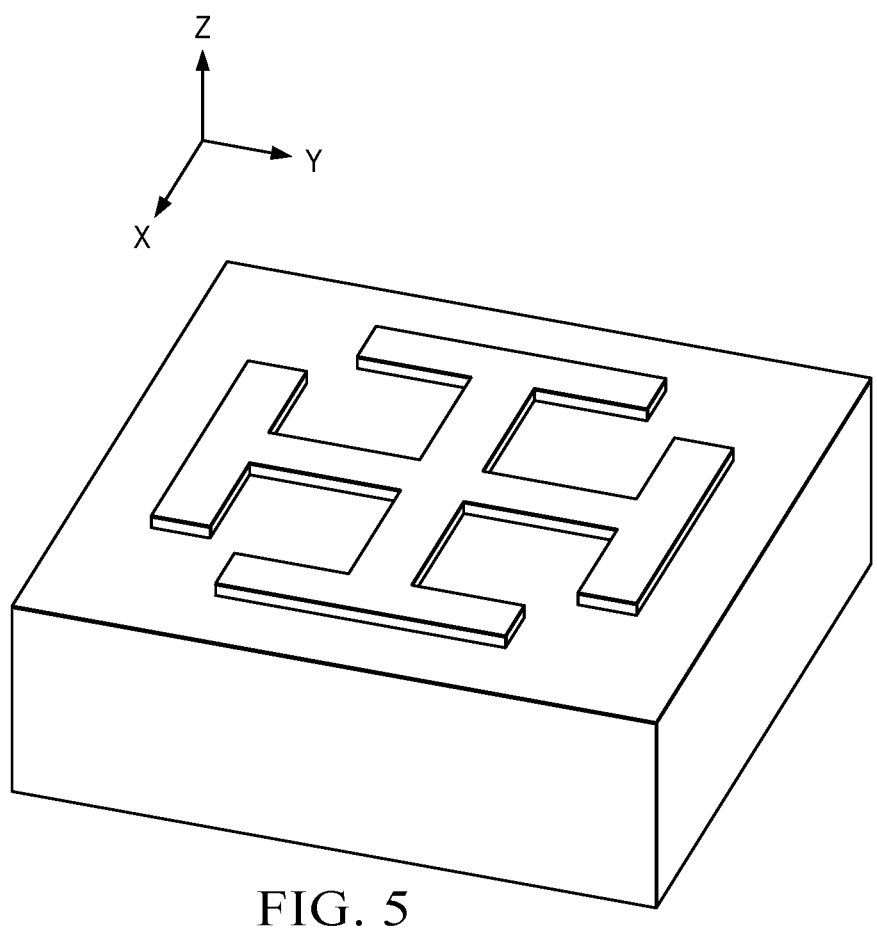
FIG. 5 depicts a diagram of a model of a JC FSS element in accordance with an illustrative embodiment.

FIG. 5 depicts a diagram of a model of a JC FSS element in accordance with an illustrative embodiment. Simulations were performed using Ansys HFSS. A single element was modeled and primary/secondary boundaries were used to effectively model an infinite array. A Floquet port was used as the source of excitation to launch a linearly polarized wave traveling in the negative z-direction. Perfect electric conductors along with a dielectric constant $\varepsilon_r=2.5$ for the substrate were used to model a single element.

Due to symmetry of the JC element, both linear polarizations (+x and +y directions) exhibit the same response. This particular element shows a strong reflection at approximately 10 GHz and operation in the X-band frequency range.

Figure 6A:
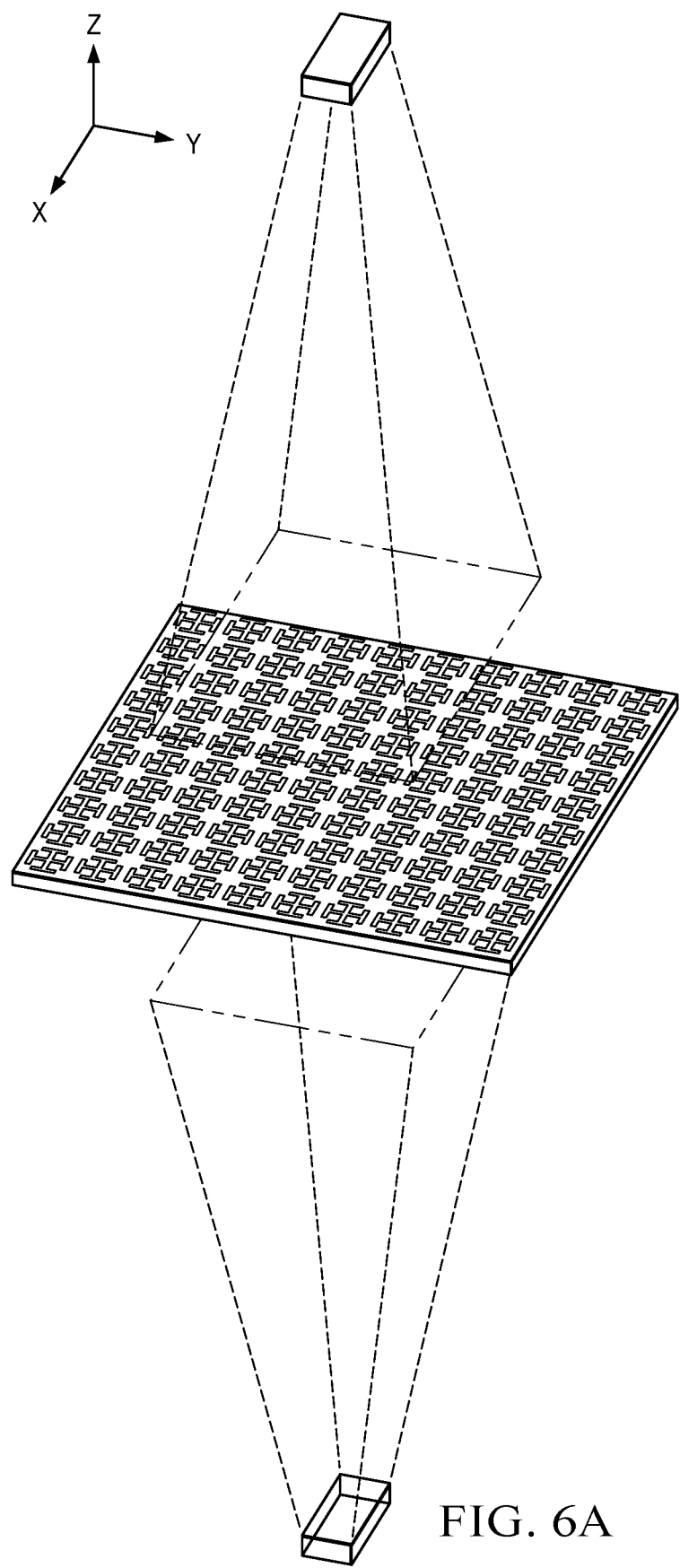
FIG. 6A depicts a diagram of a simulated finite FSS array on a flat surface.
Figure 6B:
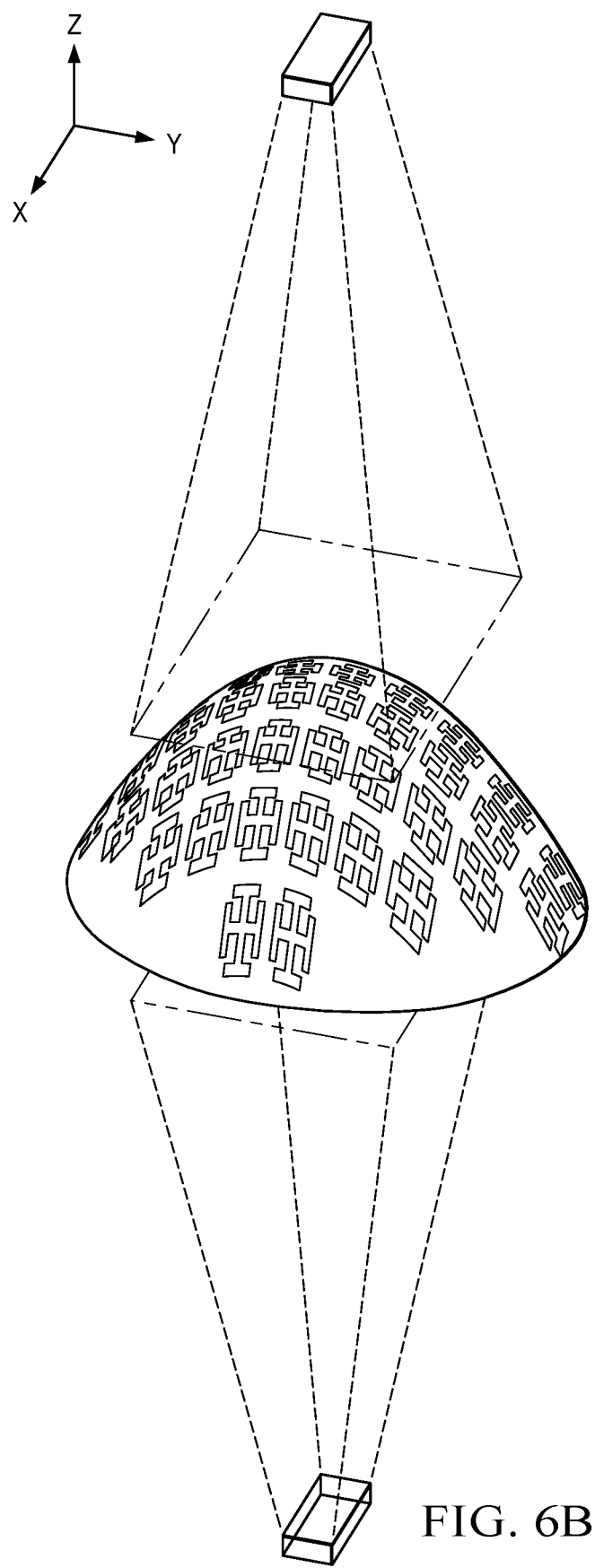
FIG. 6B depicts a diagram of a simulated finite FSS array on a parabolic dome surface.
Figure 6C:
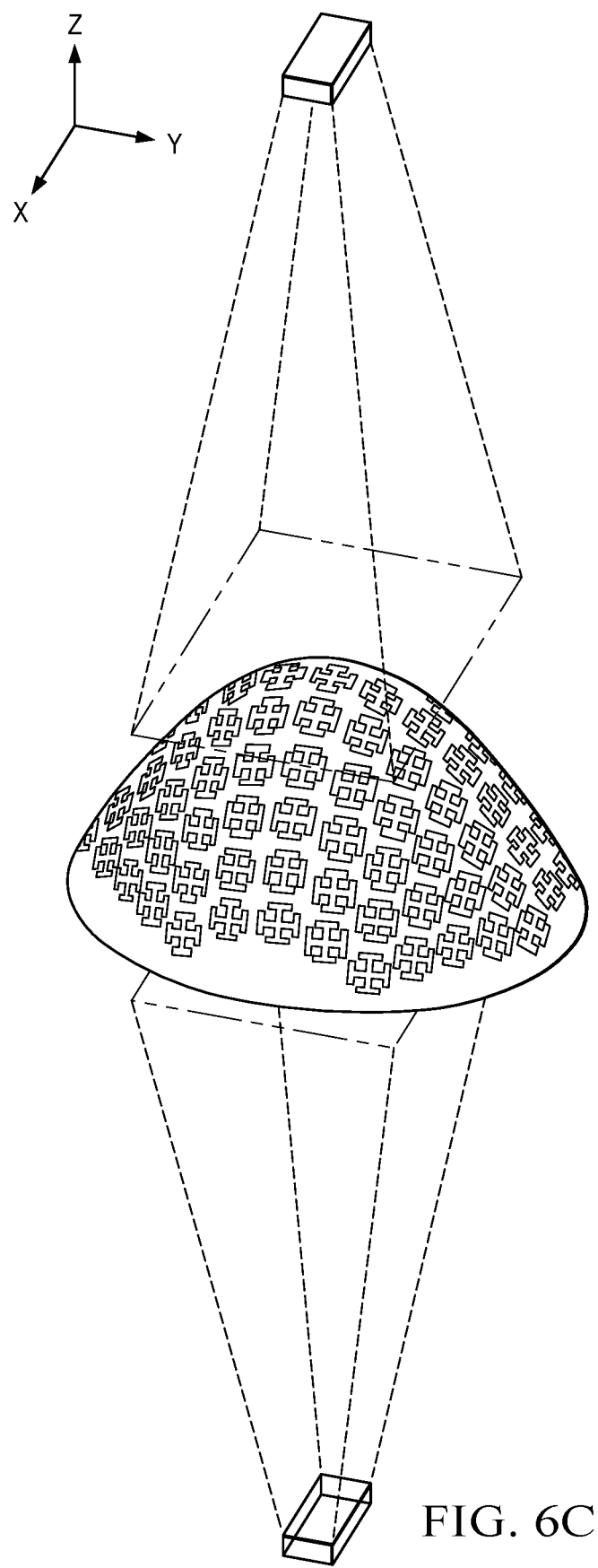
FIG. 6C depicts a diagram of a simulated finite FSS array conformed to the dome surface in accordance with an illustrative embodiment.

FIGS. 6A-6C depict diagrams illustrating simulations of finite arrays in accordance with illustrative embodiments. Following the simulation of an infinite array, simulations for more realistic finite arrays were carried out. These simulations were also done in Ansys HFSS. A flat 10×10 array of JC elements is shown on a flat 99.5 mm×99.5 mm surface in FIG. 6A, the same array projected onto a parabolic dome shown in FIG. 6B, and lastly the same array as generated by the conformal SV algorithm as shown in FIG. 6C.

As previously mentioned, operation in the X-band was desired. The simulation space created was made to emulate a measurement setup. Horn antennas modeled after Arra Inc WR90 were included. Waveports were used as the form of excitation designating one horn antenna as transmitting and another as receiving. The mode of excitation was linearly polarized along the +x and +y directions.

Careful consideration was taken to determine the total amount of JC FSS elements and substrate size relative to the horn antenna's physical aperture needed to achieve a proper response from the device. Using the same simulation setup shown in FIG. 6A, finite array simulations were performed for a flat substrate starting with a 2×2 (4 total elements) array of JC followed by 4×4 (16 total elements), 6×6 (36 total elements), 10×10 (100 total elements), and finally 14×14 (196 total elements). No resonant behavior was observed for both the 2×2 and 4×4 devices. A strong resonant response, however, was observed starting at 36 total elements with a substrate size of 59.7 mm×59.7 mm. This result was compared to the horn antenna's physical aperture which measured at 52.72 mm×76.43 mm. The response remained unchanged up to 196 total FSS elements. It is concluded that 36 elements at minimum and a substrate size of at least 59.7 mm×59.7 mm will provide a resonant response for this particular FSS element with the given dimensions. For the flat array, 10×10 total elements was chosen as more than sufficient.

Figure 7A:
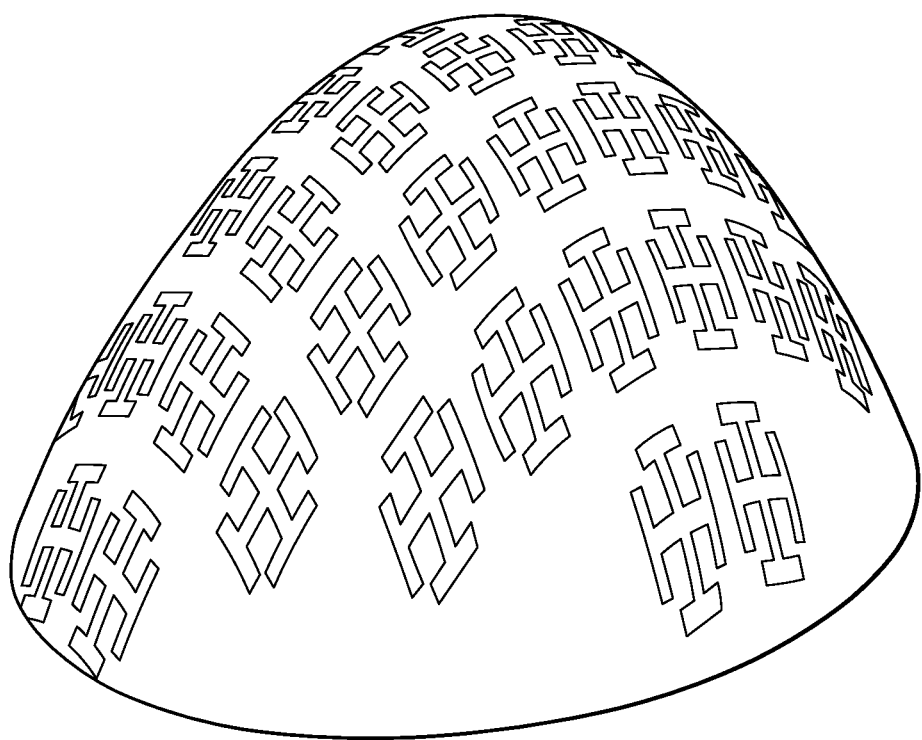
FIG. 7A depicts a perspective view of a FSS array projected onto a parabolic dome.
Figure 7B:
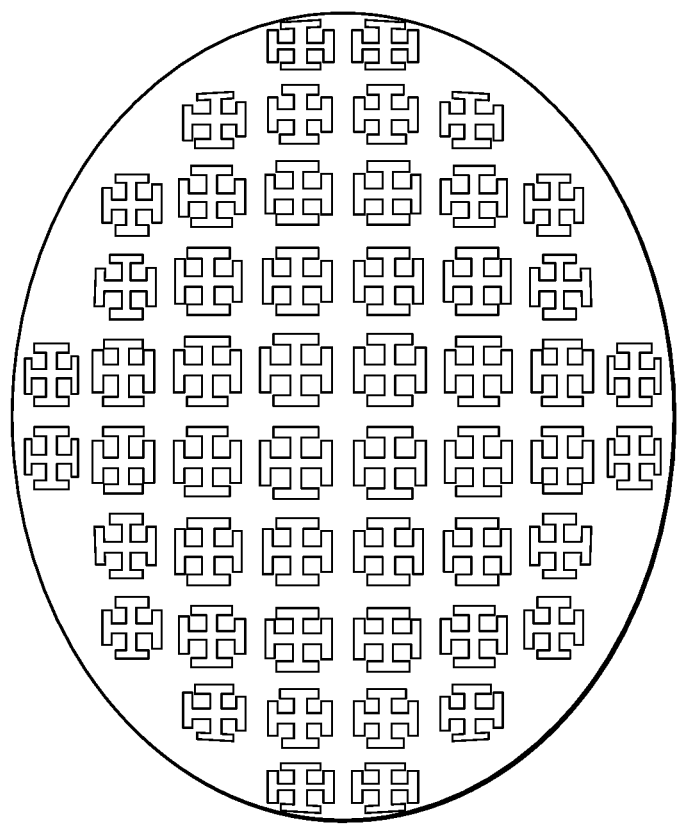
FIG. 7B depicts a top view of a FSS array projected onto a parabolic dome.
Figure 8A:
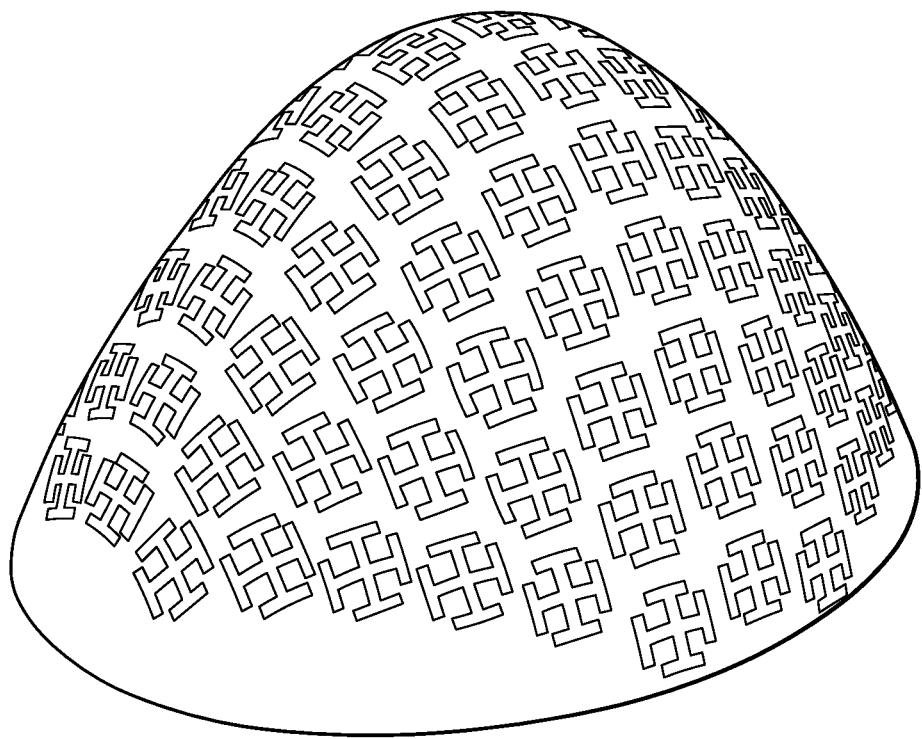
FIG. 8A depicts a perspective view of a FSS array on the parabolic dome generated by a SVL algorithm in accordance with an illustrative embodiment.
Figure 8B:
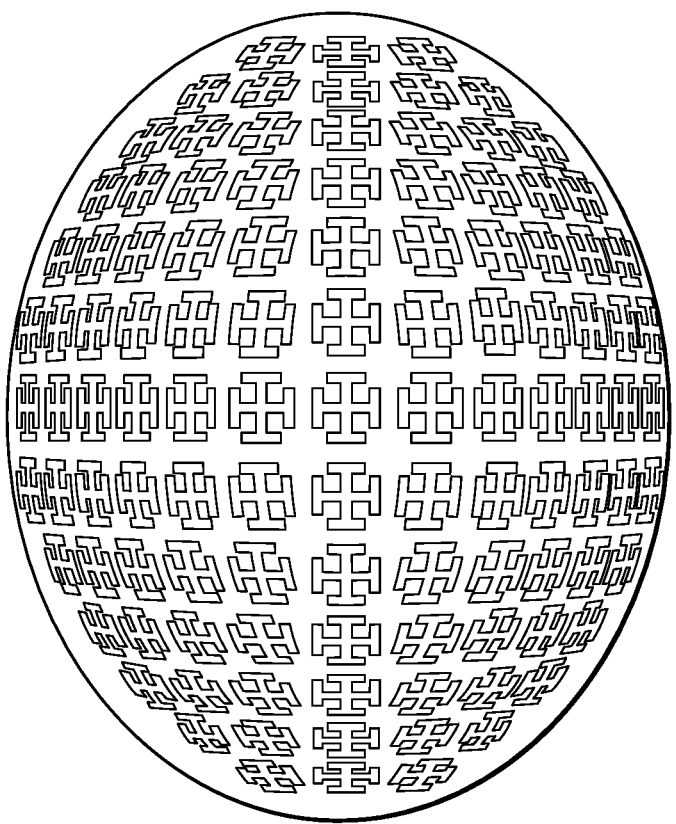
FIG. 8B depicts a top view of a FSS array on the parabolic dome generated by a SVL algorithm in accordance with an illustrative embodiment.

FIGS. 7A and 7B depict a closer view of a FSS array projected onto a parabolic dome. FIGS. 8A and 8B depict a closer view of a FSS array on the parabolic dome generated by a SVL algorithm. In this example, the overall area of the parabolic domes is the same at 81.24 mm×100 mm. Their physical sizes are well above what is necessary for a proper response.

FIGS. 7A and 7B show a closer view of the FSS array depicted in FIG. 6B, which represents a conventional approach wherein a flat array is projected onto the dome by projecting the z values of the JC FSS elements onto the surface itself and shrink-wrapping the projected JC elements onto the dome in Blender. The FSS elements can be thought of as the shadow formed from a flat FSS above the dome. This type of projection is the typical existing approach, but it deforms the elements, so the array no longer works. As shown in FIG. 7A, the elements 702 on the steepest slopes sides are stretched and deformed due to the projection.

FIGS. 8A and 8B show a closer of the FSS array depicted in FIG. 6B, which is generated using the conformal SVL algorithm of the illustrative embodiments as described above. The projected array contains 52 total elements compared to the SVL array that contains 109 total elements. This result confirms the conformal SV algorithm produces a much more efficient layout of FSS elements. Both numbers are well above the minimum necessary for a strong frequency response. The discrepancy in total element count was found necessary so that the substrate for both arrays maintained the same physical dimensions.

The models were imported into Ansys HFSS as two STL files: one file for the dome itself and another for the array of JC FSS elements. For the projected dome, noticeable deformation to the elements was observed despite having no visible deformation from the top view. The steeper the slope and more abrupt the curvature, the more deformed the FSS elements will be when projected. In comparison, the SV FSS does not distort the elements while also maintaining the overall periodicity of the array.

FIG. 9 depicts a graph illustrating the results of finite FSS array simulations in accordance with an illustrative embodiment. As shown in FIG. 9, the finite flat 10×10 array shown in FIG. 6A exhibits a dip in transmission $S_{21}$ at 9.92 GHz for a linearly polarized mode along both the +x and +y directions. The curved surface containing the projected array shown in FIG. 6B does not exhibit a response for any polarization due to deformations of the elements. In contrast, the curved SV array shown in FIG. 6C exhibits a strong response at 9.84 GHz for a wave that is linearly polarized along the +x direction and at 9.94 GHz for a wave that is linearly polarized along the +y direction. Along with a 0.1 GHz shift, a secondary resonance was observed primarily for a mode polarized along the +x direction. These effects were caused by the incident wave exciting multiple polarizations on the curved SV FSS.

Figure 10A:
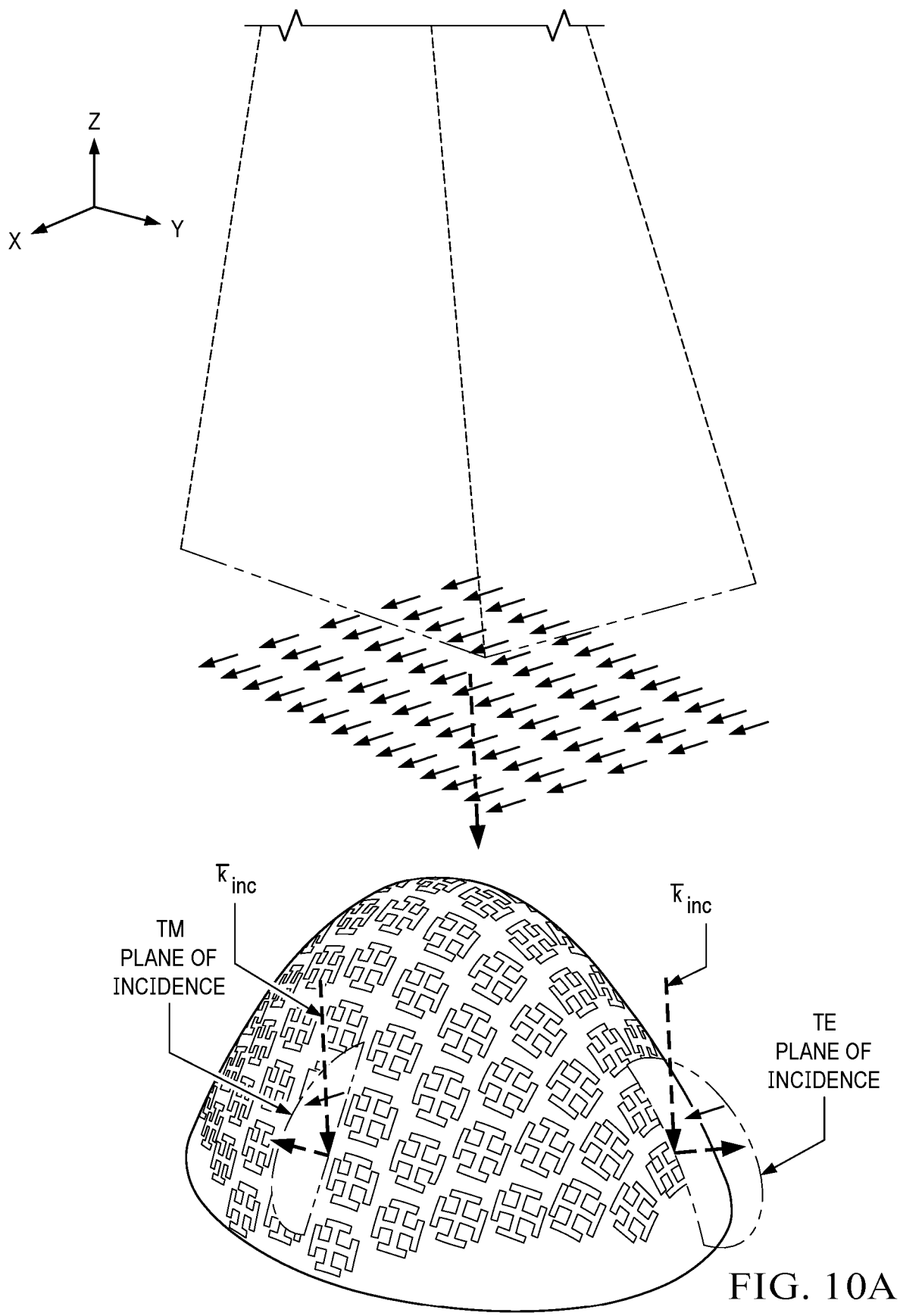
FIG. 10A depicts a diagram illustrating linear polarization in the +x direction illuminating the curved SV FSS array in the −z direction.
Figure 10B:
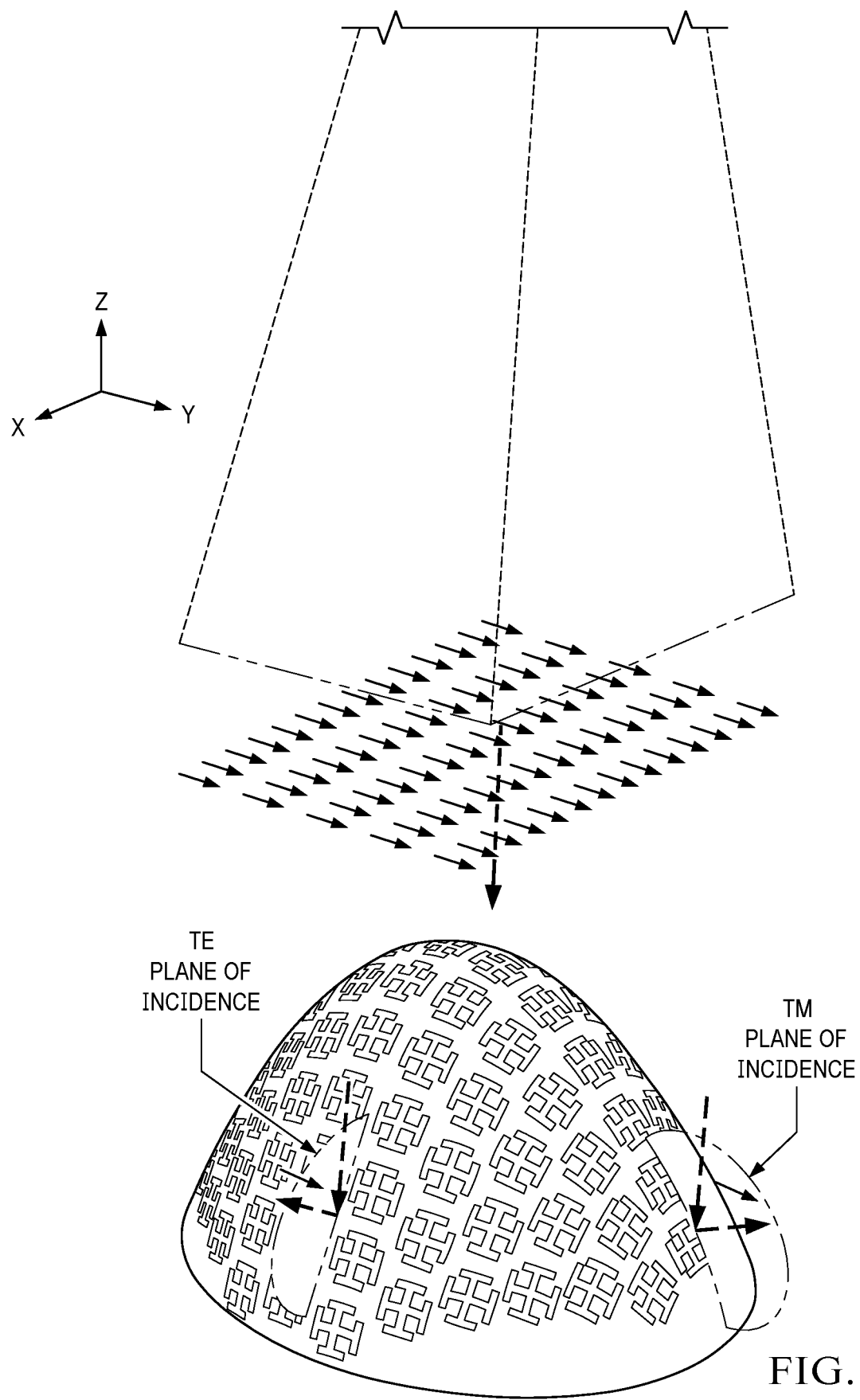
FIG. 10B represents linear polarization in the +y direction illuminating the curved SV FSS array along the −z direction.

FIGS. 10A and 10B depicts diagrams illustrating why linearly polarized modes on the curved SV FSS array excite both TE and TM polarizations on the curved FSS. FIG. 10A depicts a diagram illustrating linear polarization in the +x direction illuminating the curved SV FSS array in the −z direction. FIG. 10B represents linear polarization in the +y direction illuminating the curved SV FSS array along the −z direction. For both polarizations, the wave incident on the curved SV FSS excites a combination of transverse electric (TE) and transverse magnetic (TM) polarizations over a continuum of angles of incidence.

For a +x linearly polarized wave, the response is dominated by the TM polarization because it is TM along the broader side of the surface. For a +y linearly polarized wave, the response is dominated by the TE response because it is TE along the broader side of the surface. Regardless of the polarization of the source wave, the resulting response is always a combination of TE and TM over a range of angles of incidence.

To confirm this effect, infinite array simulations at varying angles of incidence were done. The angle of elevation θ was varied from 0° to 75° and the azimuthal angle φ was varied from 0° to 45°. While the Jerusalem cross element is known for having a robust response to angle of incidence, it was found that the resonance could shift up to 453.6 MHz for the TE polarization and up to 550.2 MHz for the TM polarization for larger angles of elevation for a flat infinite array. These same shifts were observed for the SV array due to the curvature producing different angles of incidence across the surface. Thus, the response from the SV FSS was consistent with simulations of the flat FSS but averaged over a continuum of polarizations and angle of incidence.

The SVL method is a geometry tool, capable of preserving the size, shape, and spacing of the elements to preserve the electromagnetic properties. Element designs that offer better robustness to angle of incidence would lead to conformal FSS arrays that offer the same improved performance.

The illustrative embodiments provide an algorithm capable of generating FSS that conform to any shape, curvature, or surface. This algorithm can be applied to any element and even slot arrays. The algorithm was demonstrated using a JC FSS array conformed to extreme curvature while still maintaining the performance of the array. The conformal SV FSS algorithm is not limited to any specific curve or element. It accepts an arbitrary STL, or other CAD model, as an input describing the periodic element. The flexibility of this algorithm will allow for the investigation of FSS that can be placed on any curvature regardless of constraints such as bend radius, large slopes, etc.

Furthermore, the algorithm outputs STL files making it suitable for 3D printing approaches. Ideally, conformal FSS could be printed using hybrid 3D printing approaches with one file describing the FSS array elements (conductive) and another describing the curvature (PLA or other thermoplastics). 3D printing could also enable the fabrication of much larger arbitrary surfaces. 3D printing systems that make use of more than three axes are well suited for conformal hybrid printing approaches. For standard hybrid printing systems, novel conformal printing approaches can be investigated. Off-axis slicing, hybrid off-axis toolpath planning and printing, among others can be explored.

Figure 11:
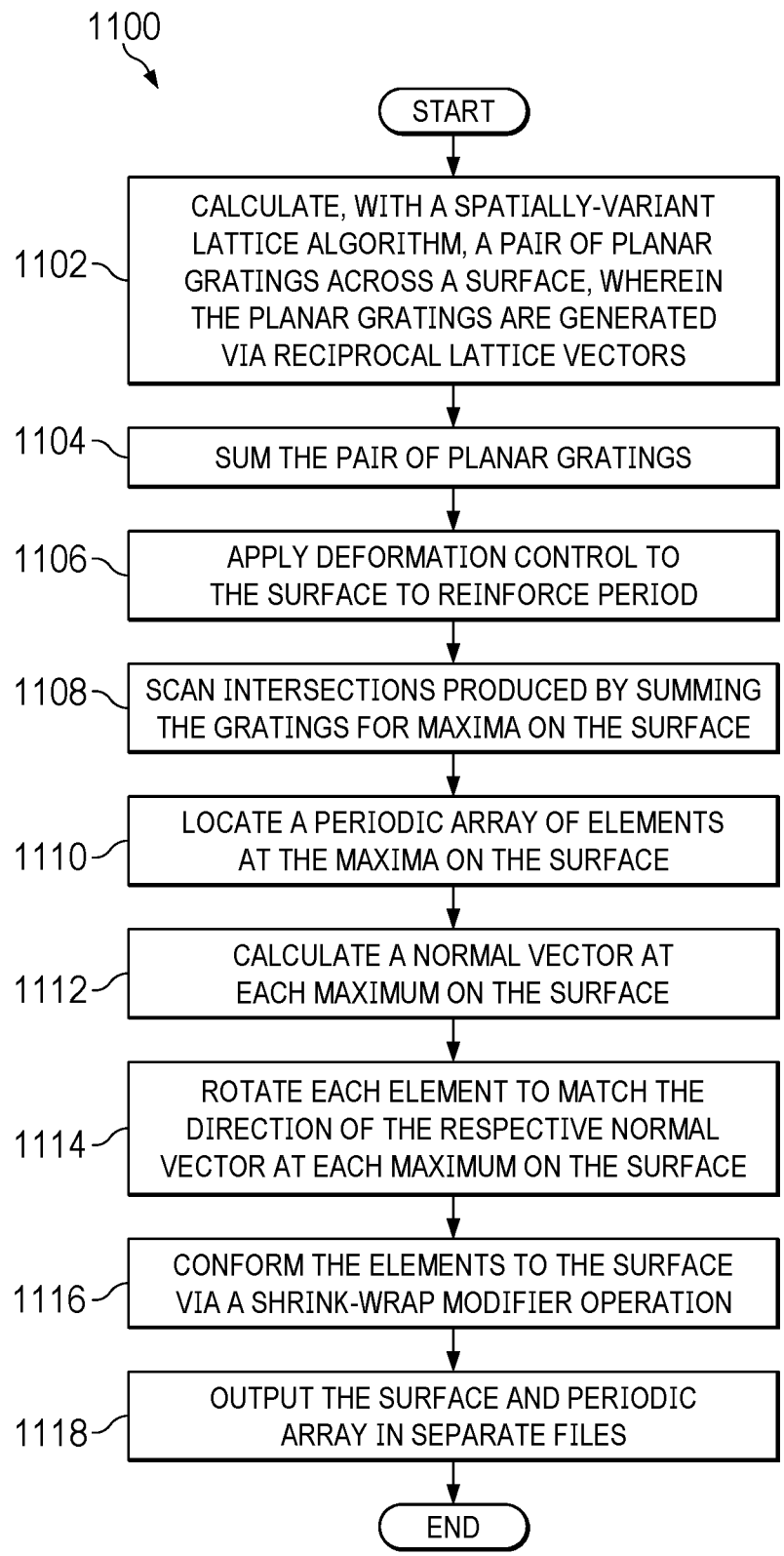
FIG. 11 depicts a flowchart illustrating a process for conforming a periodic array to a surface in accordance with an illustrative embodiment.

FIG. 11 depicts a flowchart illustrating a process for conforming a periodic array to a surface in accordance with an illustrative embodiment. The process in FIG. 11 can be implemented in hardware, software, or both. When implemented in software, the process can take the form of program code that is run by one of more processor units located in one or more hardware devices in one or more computer systems. For example, the process can be implemented in periodic array generating system 100 in computer system 150 in FIG. 1.

Process 1100 begins by calculating, with a spatially-variant lattice algorithm, a pair of planar gratings across a surface, wherein the planar gratings are generated via reciprocal lattice vectors (step 1102). The surface may comprise a singly-curved or doubly-curved surface.

Process 1100 sums the pair of planar gratings (step 1104). Deformation control may be applied to the surface to reinforce period (step 1106).

Process 1100 scans intersections produced by summing the gratings for maxima on the surface (step 1108) and locates a periodic array of elements at the maxima on the surface (step 1110). The periodic array comprises a frequency selective surfaces (FSS) array. For example, the elements may comprise Jerusalem Cross elements.

Process 1100 then calculates a normal vector at each maximum on the surface (step 1112) and rotates each element to match the direction of the respective normal vector at each maximum on the surface (step 1114).

Process 1100 conforms the elements to the surface via a shrink-wrap modifier operation (step 1116). The surface and periodic array are output in separate files (step 1118). The files may comprise STL files. Process 1100 ends thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
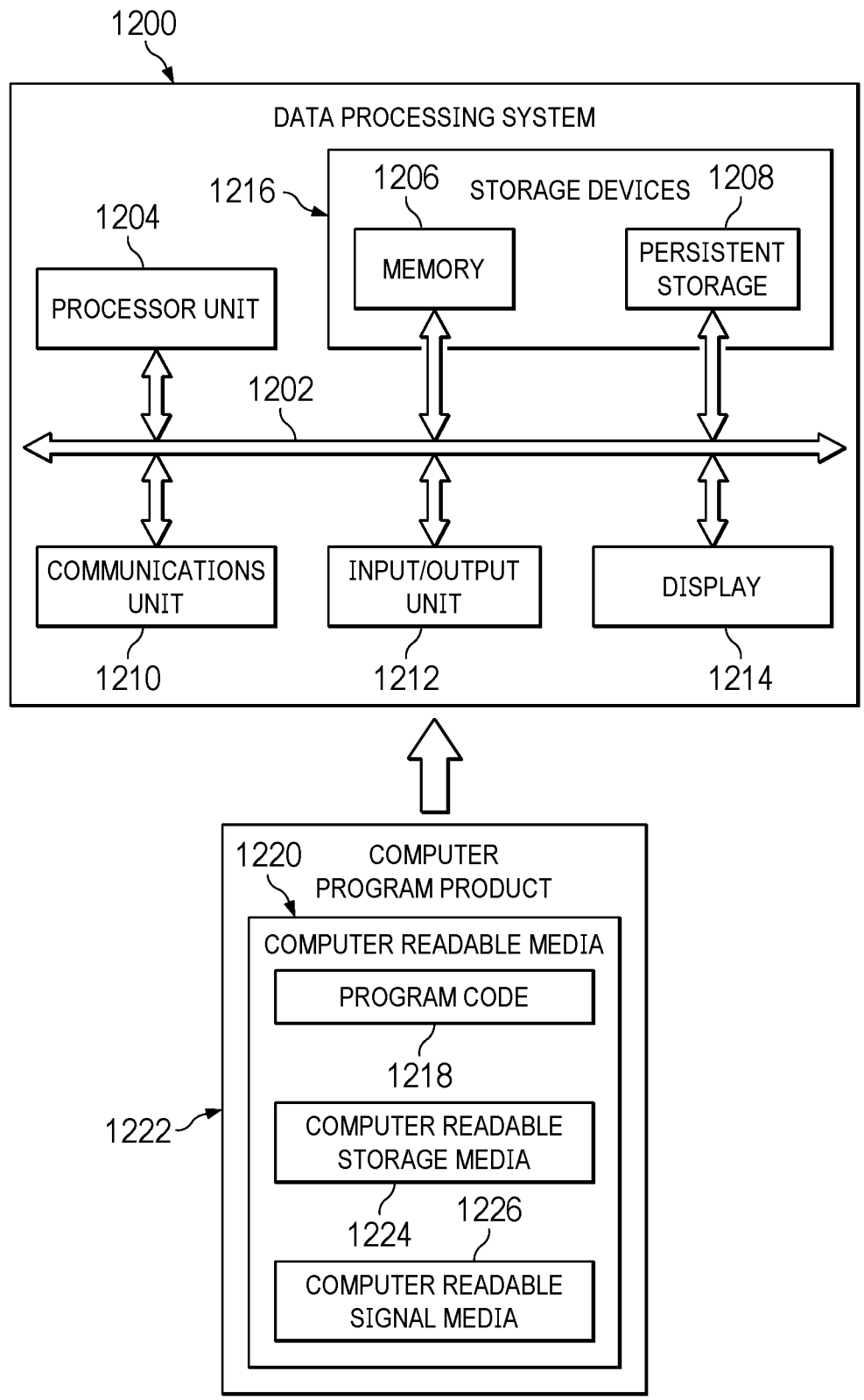
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 150 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that may be loaded into memory 1206. Processor unit 1204 may be a number of processors, a multi-processor core, or some other type of processor, depending on the particular implementation. In an embodiment, processor unit 1204 comprises one or more conventional general-purpose central processing units (CPUs). In an alternate embodiment, processor unit 1204 comprises one or more graphical processing units (CPUs).

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208. Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of conforming a periodic array to a surface, the method comprising:
   using a number of processors to perform the steps of:
   calculating, with a spatially-variant lattice algorithm, a pair of planar gratings across the surface, wherein the planar gratings are generated via reciprocal lattice vectors;
   summing the pair of planar gratings;
   scanning intersections produced by summing the gratings for maxima on the surface;
   locating a periodic array of elements at the maxima on the surface;
   calculating a normal vector at each maximum on the surface;
   rotating each element to match the direction of the respective normal vector at each maximum on the surface; and
   conforming the elements to the surface via a shrink-wrap modifier operation.

2. The method of claim 1, further comprising applying deformation control to the surface to reinforce period.

3. The method of claim 1, further comprising outputting the surface and periodic array in separate files.

4. The method of claim 3, wherein the files comprise standard tessellation language files.

5. The method of claim 1, wherein the elements comprise Jerusalem Crosses.

6. The method of claim 1, wherein the surface comprises a singly-curved or doubly-curved surface.

7. The method of claim 1, wherein the periodic array comprises a frequency selective surfaces (FSS) array.

8. A system for conforming a periodic array to a surface, the system comprising:
   a storage device configured to store program instructions; and
   one or more processors operably connected to the storage device and configured to execute the program instructions to cause the system to:
   calculate, with a spatially-variant lattice algorithm, a pair of planar gratings across the surface, wherein the planar gratings are generated via reciprocal lattice vectors;
   sum the pair of planar gratings;
   scan intersections produced by summing the gratings for maxima on the surface;
   locate a periodic array of elements at the maxima on the surface;
   calculate a normal vector at each maximum on the surface;
   rotate each element to match the direction of the respective normal vector at each maximum on the surface; and
   conform the elements to the surface via a shrink-wrap modifier operation.

9. The system of claim 8, wherein the processors further execute instructions to applying deformation control to the surface to reinforce period.

10. The system of claim 8, wherein the processors further execute instructions to output the surface and periodic array in separate files.

11. The system of claim 10, wherein the files comprise standard tessellation language files.

12. The system of claim 8, wherein the surface comprises a singly-curved or doubly-curved surface.

13. The system of claim 8, wherein the periodic array comprises a frequency selective surfaces (FSS) array.

14. A computer program product for conforming a periodic array to a surface, the computer program product comprising:
   a computer-readable storage medium having program instructions embodied thereon to perform the steps of:
   calculating, with a spatially-variant lattice algorithm, a pair of planar gratings across the surface, wherein the planar gratings are generated via reciprocal lattice vectors;
   summing the pair of planar gratings;
   scanning intersections produced by summing the gratings for maxima on the surface;
   locating a periodic array of elements at the maxima on the surface;
   calculating a normal vector at each maximum on the surface;
   rotating each element to match the direction of the respective normal vector at each maximum on the surface; and
   conforming the elements to the surface via a shrink-wrap modifier operation.

15. The computer program product of claim 14, further comprising instructions for applying deformation control to the surface to reinforce period.

16. The computer program product of claim 14, further comprising instructions for outputting the surface and periodic array in separate files.

17. The computer program product of claim 16, wherein the files comprise standard tessellation language files.

18. The computer program product of claim 14, wherein the elements comprise Jerusalem Crosses.

19. The computer program product of claim 14, wherein the surface comprises a singly-curved or doubly-curved surface.

20. The computer program product of claim 14, wherein the periodic array comprises a frequency selective surfaces (FSS) array.

* * * * *